(12) United States Patent
Benisty et al.

(10) Patent No.: US 11,563,570 B2
(45) Date of Patent: Jan. 24, 2023

(54) STORAGE SYSTEM AND METHOD FOR COMMAND EXECUTION ORDERING BY SECURITY KEY

(71) Applicant: Western Digital Technologies, Inc., San Jose, CA (US)

(72) Inventors: Shay Benisty, Beer Sheva (IL); Amir Segev, Meitar (IL)

(73) Assignee: Western Digital Technologies, Inc., San Jose, CA (US)

( * ) Notice: Subject to any disclaimer, the term of this patent is extended or adjusted under 35 U.S.C. 154(b) by 374 days.

(21) Appl. No.: 16/878,230

(22) Filed: May 19, 2020

(65) Prior Publication Data

US 2021/0367777 A1    Nov. 25, 2021

(51) Int. Cl.
| | |
|---|---|
| *H04L 9/08* | (2006.01) |
| *H04L 9/14* | (2006.01) |
| *G06F 12/121* | (2016.01) |
| *G06N 20/00* | (2019.01) |
| *G06N 5/04* | (2006.01) |

(52) U.S. Cl.
CPC .......... *H04L 9/0894* (2013.01); *G06F 12/121* (2013.01); *H04L 9/14* (2013.01); *G06F 2212/1021* (2013.01); *G06N 5/04* (2013.01); *G06N 20/00* (2019.01)

(58) Field of Classification Search
CPC ....... H04L 9/0894; H04L 9/14; H04L 9/0861; H04L 9/0822; G06F 12/121; G06F 2212/1021; G06F 21/85; G06F 12/0866; G06F 2212/466; G06F 21/78; G06F 21/62; G06F 21/71; G06N 5/04; G06N 20/00

See application file for complete search history.

(56) References Cited

U.S. PATENT DOCUMENTS

| | | | | |
|---|---|---|---|---|
| 9,665,501 | B1* | 5/2017 | Obukhov | G06F 12/1408 |
| 2010/0217977 | A1* | 8/2010 | Goodwill | G06F 21/78 |
| | | | | 713/167 |
| 2010/0252909 | A1* | 10/2010 | Nakanishi | H01L 27/1021 |
| | | | | 257/532 |
| 2010/0332844 | A1 | 12/2010 | Kobayashi | |
| 2011/0072276 | A1* | 3/2011 | Lee | G06F 21/80 |
| | | | | 713/189 |
| 2011/0087898 | A1* | 4/2011 | Williams | H04L 9/3236 |
| | | | | 380/46 |
| 2013/0229301 | A1* | 9/2013 | Kanamoto | G01S 13/584 |
| | | | | 342/158 |
| 2019/0384719 | A1* | 12/2019 | Lappi | G06F 3/0679 |
| 2021/0312055 | A1* | 10/2021 | Kloth | G06F 21/79 |

FOREIGN PATENT DOCUMENTS

| | | |
|---|---|---|
| KR | 20140025541 A | 3/2014 |
| KR | 20140097927 A | 8/2014 |
| KR | 101923289 B1 | 11/2018 |

* cited by examiner

*Primary Examiner* — Abiy Getachew

(74) *Attorney, Agent, or Firm* — Crowell & Moring LLP

(57) ABSTRACT

A storage system and method for command execution ordering by security key are provided. In one example, the storage system has a non-volatile memory, a volatile memory storing a plurality of keys, and a controller with a cache storing a subset of the plurality of keys. The storage system gives priority to a command whose key is stored in the cache in the controller over commands whose keys are stored only in the volatile memory. This avoids transferring a key from the volatile memory to the cache in the controller, thereby improving efficiency of the storage system.

20 Claims, 8 Drawing Sheets

STORAGE SYSTEM AND METHOD FOR COMMAND EXECUTION ORDERING BY SECURITY KEY

BACKGROUND

A storage system can be used to securely store data provided by a host. Different standards govern the encryption/decryption process used for secure storage of data. One such standard allows the host to select the encryption/decryption key for every input-output (I/O) command to the storage system. Under this standard, the storage system receives and stores a key from the host, and the host selects a key for each I/O command.

DETAILED DESCRIPTION

By way of introduction, the below embodiments relate to a storage system and method for command execution ordering by security key. In one embodiment, the storage system has at least one memory storing a plurality of keys, and a controller with a cache storing a subset of the plurality of keys. The storage system gives priority to a command whose key is stored in the cache in the controller over commands whose keys are stored only in the at least one memory. This avoids transferring a key from the at lease one memory to the cache in the controller, thereby improving efficiency of the storage system. Other embodiments are possible, and each of the embodiments can be used alone or together in combination. Accordingly, various embodiments will now be described with reference to the attached drawings.

Figure 1A:
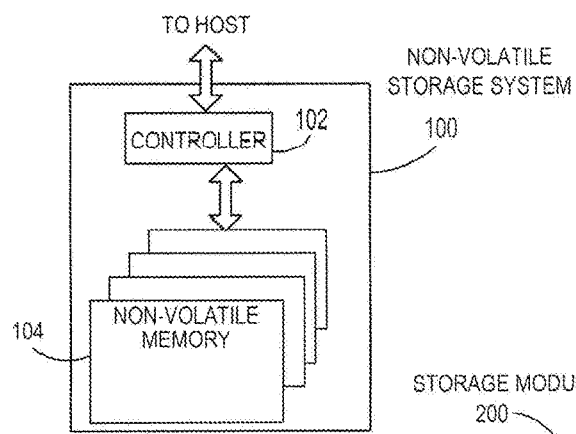
FIG. 1A is a block diagram of a non-volatile storage system of an embodiment.
Figure 1B:
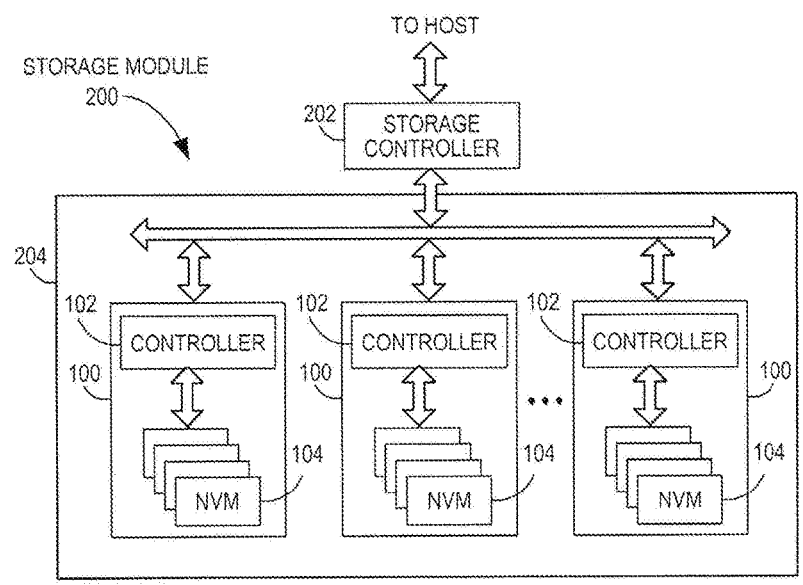
FIG. 1B is a block diagram illustrating a storage module of an embodiment.
Figure 1C:
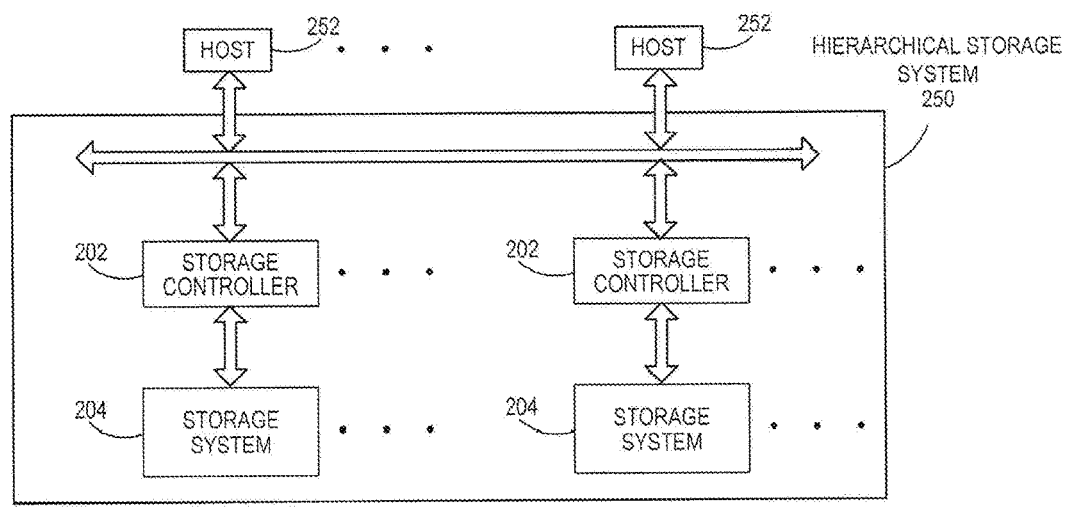
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
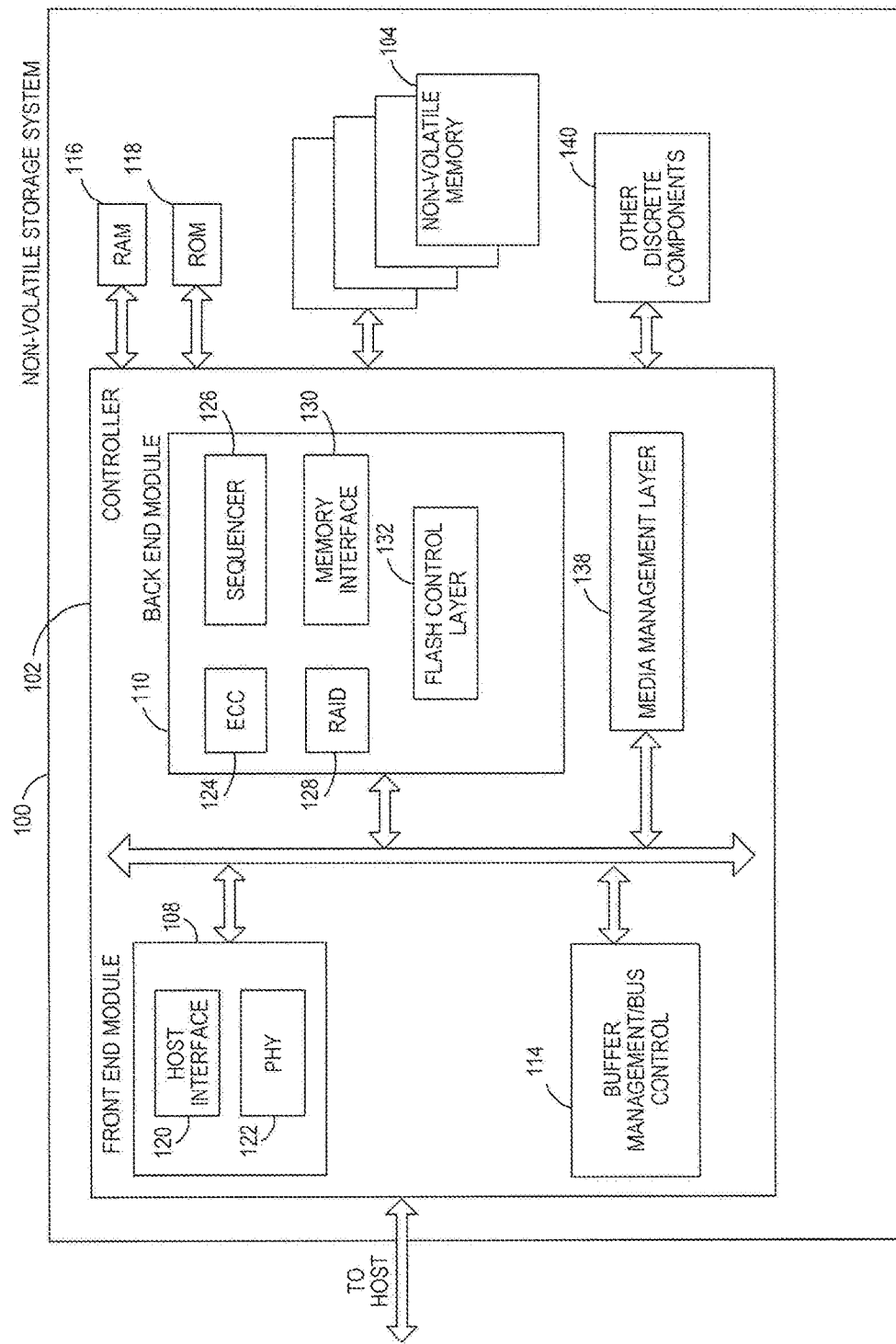
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
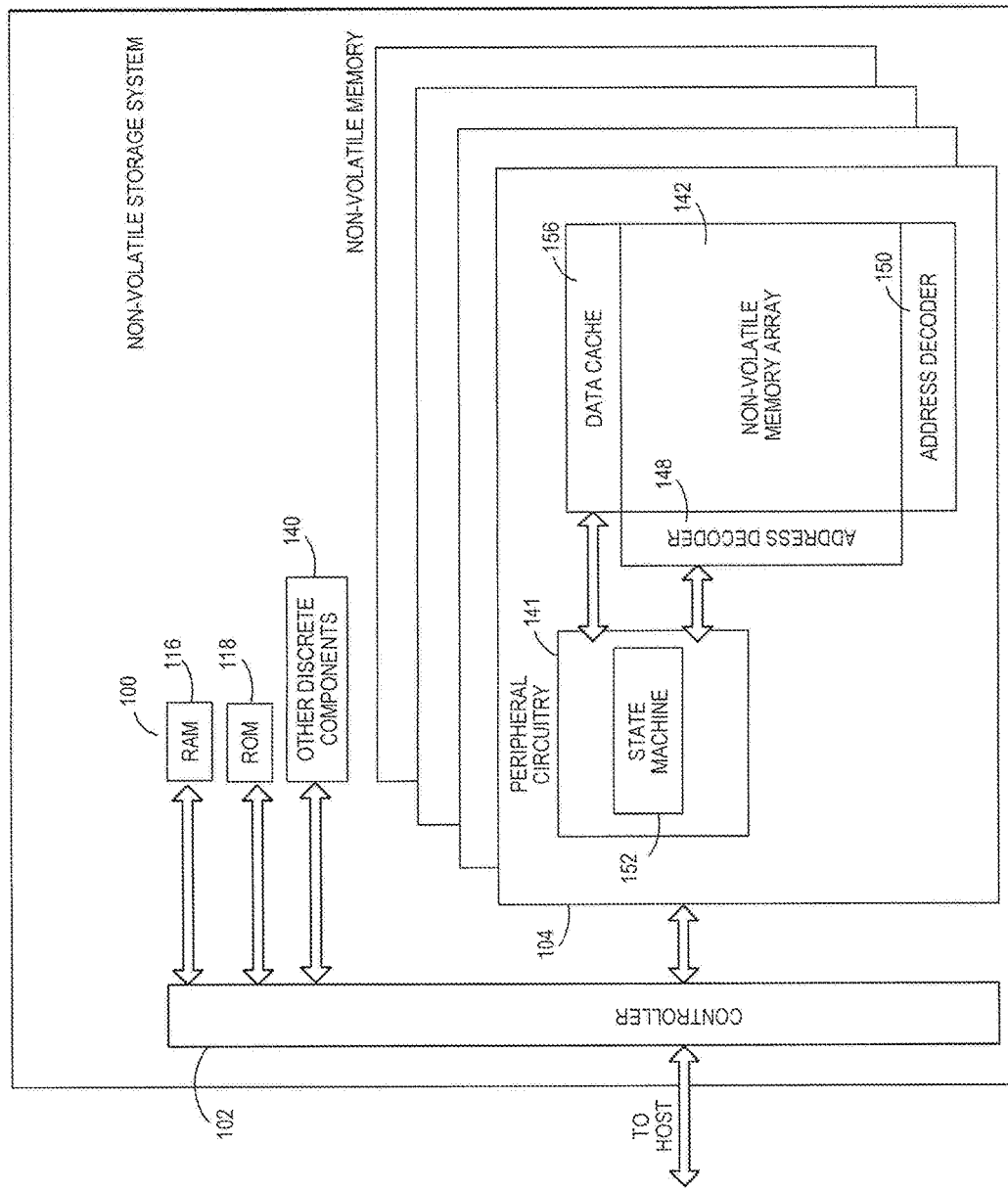
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

The storage system 100 can be configured to securely store data. Part of the requirement for secure data storage is protecting user data. This can require encryption and decryption mechanisms, such as an Advanced Encryption Standard (AES) control engine. It may be desired for the storage system 100 (sometimes referred to herein as the device) to not hinder performance due to encryption/decryption. A recent requirement of the NVMe standard is to allow the host to select the encryption/decryption key for every input-output (I/O) command, referred to as Key Per IO (KPIO). To meet this requirement, a storage system must be able to receive and store a key from a host while the host must be able to select a loaded key in each I/O command. Under this requirement, the storage system may need to support more keys than it can handle without storing at least some of them outside of the controller die.

Figure 3:
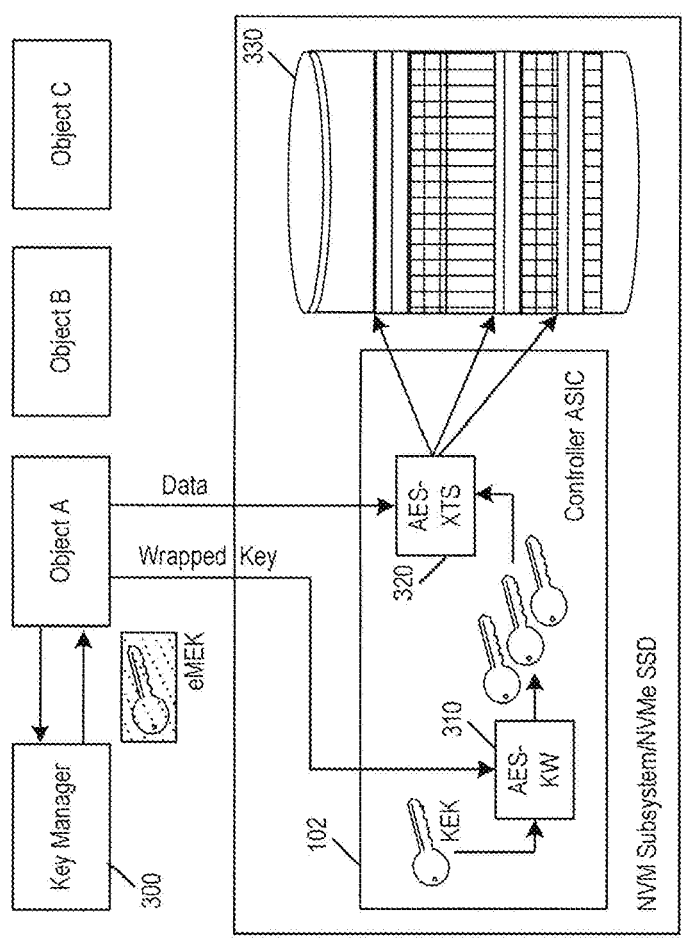
FIG. 3 is a block diagram of a storage system of an embodiment implementing a key for every input-output (I/O) command (Key Per IO (KPIO)) feature.

FIG. 3 is a block diagram of a storage system of an embodiment implementing the KPIO feature. As shown in FIG. 3, a key manager 300 in the host sends an object to the storage system containing data and a wrapped/encrypted media encryption key (eMEK). When the storage system 100 receives the object, the storage system's controller 102 takes the eMEK and decrypts it using its internal key encryption key (KEK) via an AES key wrap (KW) 310 decryption algorithm. This provides a set of keys that the controller 102 can use to encrypt the data from the host using an AES encryption algorithm 320. The controller 102 then stores the encrypted data in the memory 330 of the storage system.

AES is a block cipher that encrypts blocks of data in 128 bits. To encrypt anything larger than 128 bits, AES uses a block cipher mode. There are many different AES block cipher modes that are part of the AES specification. The simplest block cipher mode is Electronic Code Book (ECB). Cipher Block Chaining (CBC) addresses security weaknesses with ECB and is one of the most-common modes used in portable encrypting flash drives. XTS is one of the newest modes and provides stronger data protection over ECB and CBC.

Figure 4:
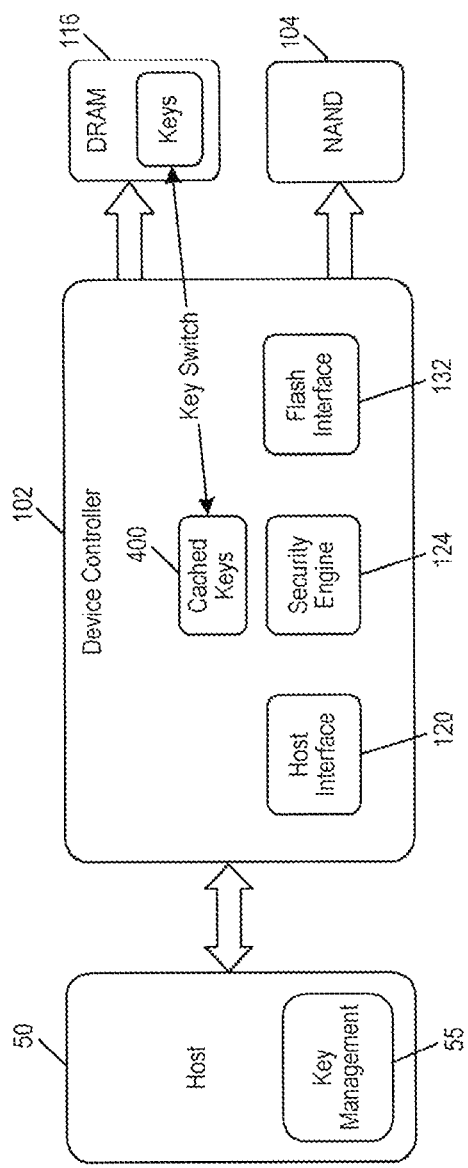
FIG. 4 is a block diagram of a storage system of an embodiment that illustrates key caching.

The key per IO feature is usually used when many keys are supported. In that case, most of the keys are stored in external memories, such as DRAM or NAND (e.g., in DRAM-less systems), while only few of them are cached internally. This is illustrated in FIG. 4. As shown in FIG. 4, a key management module 55 in the host 50 is responsible for key management as defined by the key per I/O feature. All keys that were generated by the host 50 are stored in the storage system's DRAM 116, while the storage system 100 caches some keys internally in SRAM or flip-flops 400. When the required key exists in the cache 400, the storage system 100 is able to transfer data immediately using the cached key. Otherwise, at least one key can be evicted from the cache 400 and replaced by the required key read from the DRAM 116. After completing this key switch, the data can be transferred. The keys that are stored in the DRAM 116 are secure, but there can be other security protection mechanism applied when replacing a key, which would increase latency. It should be noted that while the plurality of keys are stored in DRAM 116 in this example, the plurality of keys can be stored in another type of memory, such as NAND. Accordingly, the phrase "at least one memory storing a plurality of keys" will be used herein to refer to the various possibilities of key storage (e.g., in a DRAM or other memory separate from NAND, in the NAND instead of DRAM, etc.).

Figure 5:
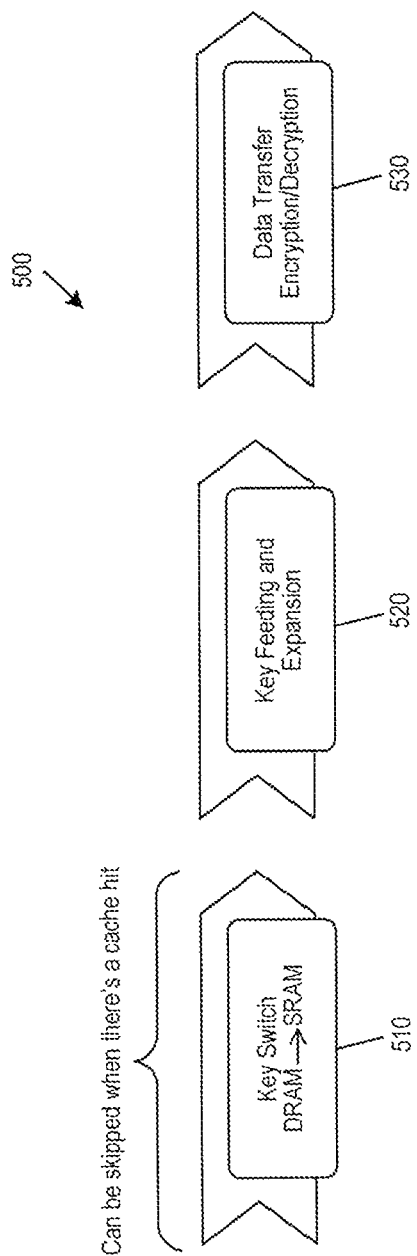
FIG. 5 is a diagram that illustrates the flow of an encryption/decryption operation of an embodiment.

As mentioned above, the loading of keys from DRAM 116 requires some ahead-of-time preparations and extra latency. FIG. 5 depicts the AES-XTS activation flow required for each chunk of data that requires an encryption or decryption operation. As shown in FIG. 5, there are three main phases. In the key switch phase 510, logic in the controller 102 fetches the key from DRAM 116 and puts it in the cache 400. As indicated in the drawing, this phase is needed only where there is a cache miss, so this step can be skipped when there is a cache hit. By skipping this step, keys are not loaded from DRAM 116, which reduces latency, provided better performance, and saves power. In one embodiment implemented in hardware, the key switch phase duration is ~200 microseconds (usec).

Next is the key feeding and expansion phase 520. In this phase, the AES-XTS engine gets the required keys and initial vector (IV) and generates multiple keys based on the original provided keys and IV. This operation introduces some latency depending on the key size (e.g., 13 or 17 cycles). The last phase is the data transfer phase 530. In this phase, after having all internal keys required for the data transfer, the data can be transferred in a pipeline manner (e.g., output data is available in each cycle but after some latency).

The following embodiments can be used to address the problem of performance degradation involved in key loading from DRAM 116 to the cache 400 for secured data and provides a new mechanism for minimizing those key switches. This problem becomes even worse when the encryption or decryption order is not known in advanced (e.g., when having multiple flows that use the XTS engine, and the order is not known in advanced but only when the data is available). In such a situation, only after the order is determined will the keys and IV be driven to the engine, which results in lost performance until completing the key expansion phase.

In one embodiment, encode/decode commands are executed with minimal key switching. The embodiment takes advantage of the ability under the NVMe standard of the storage system 100 to process commands out of order. Using this ability, the storage system 100 can select the next command to service based on the keys that are held in the cache 400, which results in less key switching. In general, when fetching commands from the host 50, the storage system 100 prefers to fetch commands that use the keys that are currently stored in the cache 400. This fetching mechanism can be based on history or be machine-learning based. For example, the storage system 100 can fetch the next commands from a submission queue that used (mostly) the keys stored in the cache 400. The storage system 100 can select the next command to service based on the keys that are held in the cache 400 rather than having key switches. The storage system 100 can use a method of key eviction based on the keys that are going to be used soon, as the storage system 100 may prefer to evict keys that are not needed soon.

The device controller 102 (e.g., the data path part of the controller 102) can be responsible for moving data from the host DRAM into the NAND 104 (or the other way around) with security operations (encryption or decryption) implemented on the data. (DRAM is just an example used in this embodiment, and the data can come from another location, such as, but not limited to, SRAM, a different non-volatile memory, a solid-state drive, a hard disk drive, directly from the Ethernet, etc.) The controller 102 (e.g., the control path part of the controller 102) can be responsible for fetching the commands and providing the data path with the required information to execute those commands. The following paragraphs discuss the operations performed in the control path. The storage system 100 can schedule the commands and the data transfers based on many other parameters. However, with this embodiment, the storage system 100 considers the key values and schedules the transfer to result in fewer/minimum key switches, thereby avoiding performance and power issues that may accompany those switches.

Figure 6:
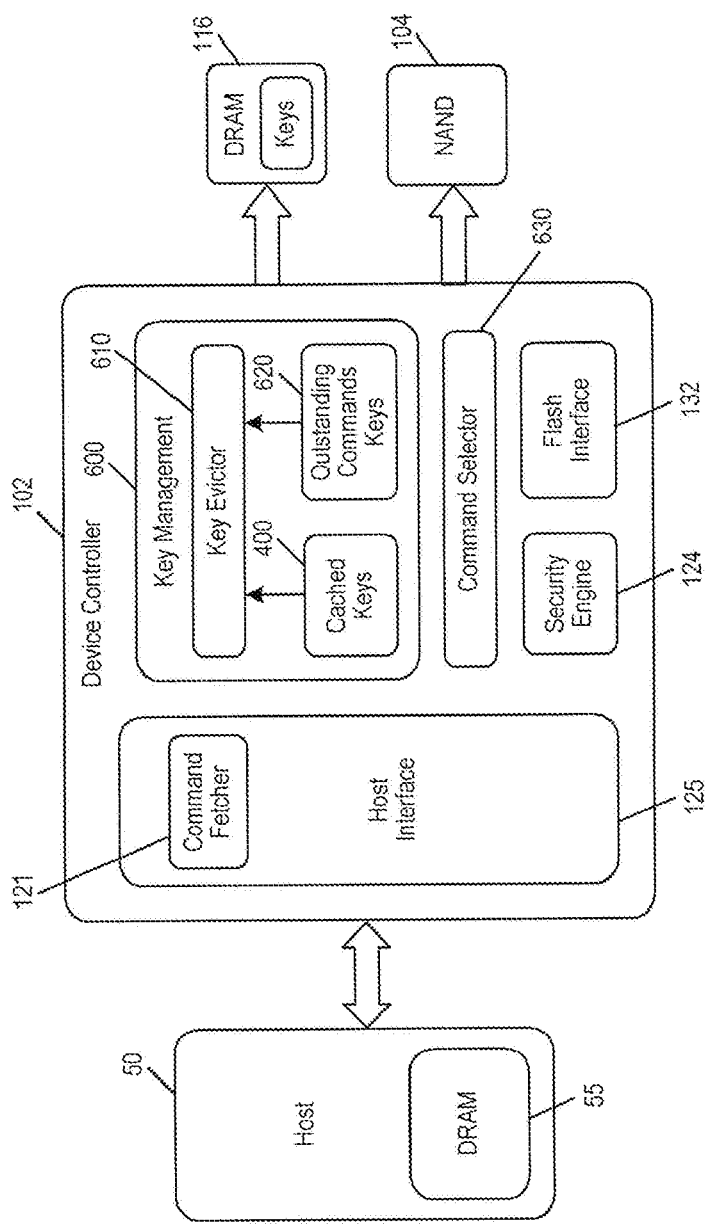
FIG. 6 is a block diagram of a storage system of an embodiment that illustrates key caching.

FIG. 6 is a block diagram of a storage system 100 that can be used to implement this embodiment. It should be noted that this is merely an example, and other implementations can be used. As shown in FIG. 6, in this embodiment, the storage system's controller 102 comprises a command fetcher 121 in the controller's host interface 125, a key management module 600, a command selector 630, a security engine 124, and a flash interface 132. As noted above, some or all of these components can be implemented in hardware and/or software (e.g., with a processor executing computer-readable program code). FIG. 6 also shown the DRAM 116 and NAND 104, which are part of the storage system 100. The host 50 comprises its own DRAM 55, which serves as a key management module, and is in communication with the host interface 125 of the storage system's controller 102.

In this embodiment, the host DRAM 55 is where both the commands, data related to those commands, and keys reside. The NAND 104 is the source (for read commands) or destination (for write commands) for the data. The components in the control path in the controller 102 are responsible for fetching commands, storing them internally, and arbitrating which command to execute. The components in the control path in the controller 102 also store the keys used by the different commands. The keys are used by the command selector 630 to best select which command to service next. Once a decision is made, the components in the control path in the controller 102 trigger the components in the data path in the controller 102. For a read operation, the flash interface module 132 reads data from the NAND 104 and pushes it to the security engine 124 (e.g., AES), where it goes to a direct memory access module in the controller 102 to write the host's DRAM 55. A similar operation occurs in reverse for a write operation.

In the embodiment, the controller 102 has a key management module 600, which is responsible for managing the keys driven by the host 50. The key management module 600 has a cache 400 that holds some keys internally, which is a subset of all the keys are stored in the DRAM 116. The key management module 600 also has a storage 620 that holds all key indexes of the pending commands in the storage system 100. Based on the information about the pending commands, the key management module 600 can activate the command selector 630 and give it instructions about the preferred keys for the next commands. The command selector 630, based on those instructions and history, decides from which queues the next commands will be fetched. Based on the outstanding command keys storage 620, the key evictor 610 decides which keys will be evicted next and when.

Figure 7:
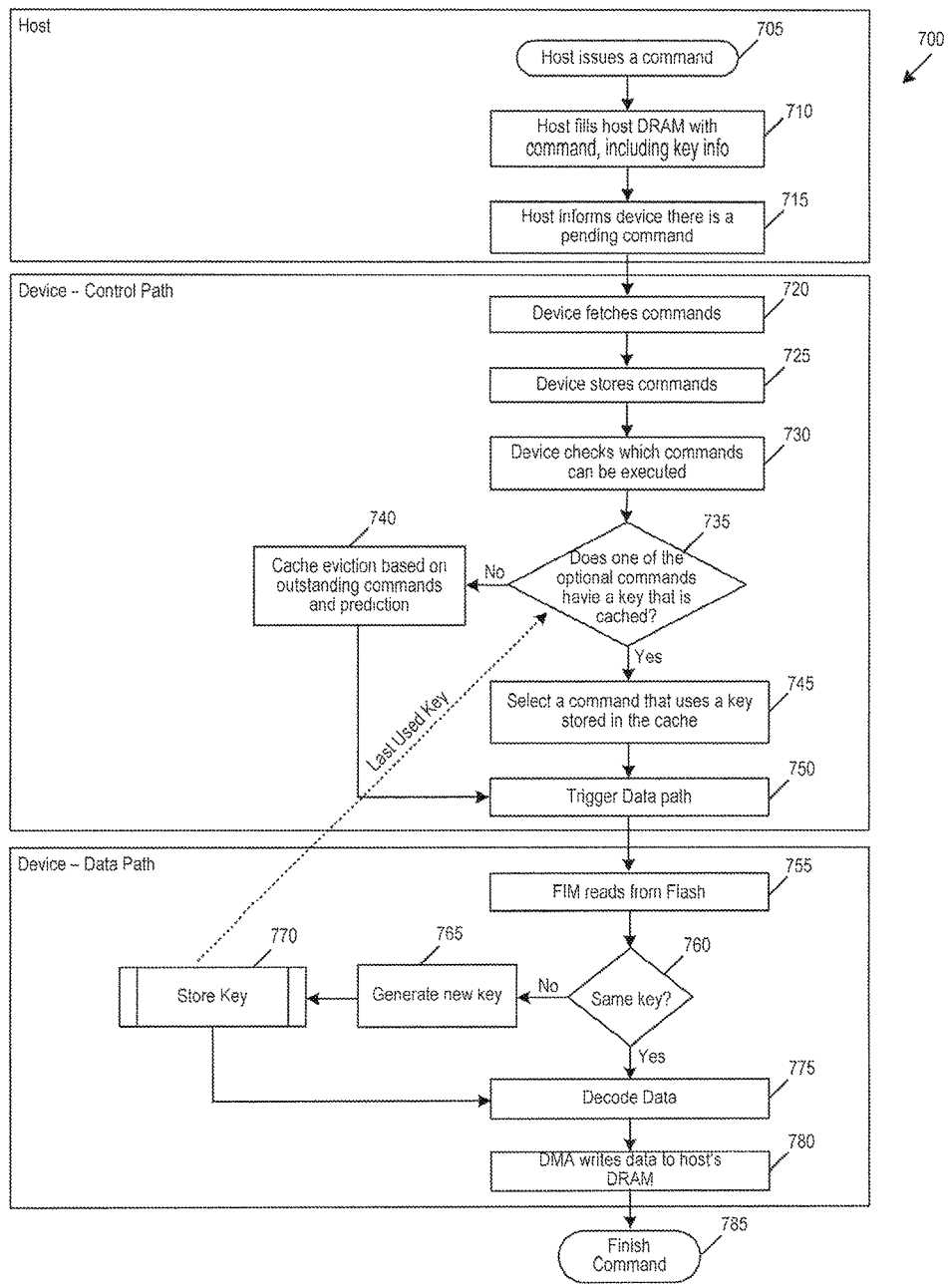
FIG. 7 is a flow chart of a method of an embodiment for command execution ordering by security key.

FIG. 7 is a flow chart 700 that illustrates how this method can be implemented for a read command. As shown in FIG. 7, the host 50 issues a command (act 705) and begins filling its DRAM 55 with the command and related information (e.g., for a write command, the actual data), and the part of the actual command contains the key index (act 710). The host 50 then informs the storage system 100 that a pending command exists that should be executed (act 715).

The control path in the storage system's controller 102 fetches the command from the host's DRAM 55 (act 720) and stores it (act 725). (In another embodiment, the host can write the command directly to the controller, instead of having the controller read the command. For NVMe, this feature is called Controller Memory Buffer and can be portrayed as part of the host memory/DRAM (which can appear instead the controller).) The controller 102 in the storage system 100 keeps track of the command storage and determines which commands can be executed (act 730). The controller 102 then determines which of those commands have a key that is already cached in the controller's cache 400 (act 735). This way, the controller 102 can choose to service a new command whose key is the same as the previous one. In one embodiment, if none of the commands have a cached key, the controller 102 evicts a key that is in the cache 400 based on the outstanding commands and on a prediction of which key is not needed (act 740). The controller 102 can then select a command whose key is the most common between all pending commands. Once a decision is made, the data path is informed (act 750).

However, if one of the commands does have a cached key, the controller 102 selects the command that uses a key stored in the cache 400 (act 745), and the data path is informed (act 750).

The controller's data path starts by reading from the NAND 104 through the FIM 132 (act 755). The controller 102 then confirms whether the key needed to decode the data has already been cached and the same key can be used (act 760). If the key needed to decode the data has already been cached, data is pushed to the decryption (AES) engine 124 for decoding (act 775), and, from there, the direct memory access (DMA) module in the controller 102 sends the decrypted data to the host's DRAM 55 (act 780), after which the command is finished (act 785).

If the key needed to decode the data has not already been cached, the controller 102 generates a new key (act 765) and stores the key in the cache 400 (act 770). That key then becomes the last key used the next time act 735 is performed. The data is then decoded as described above.

There are several advantages associated with these embodiments. For example, these embodiments can help maintain performance upon multiple keys scenarios, at a negligible cost to size and at no latency cost. Also, these embodiments do not require a frequency increase, which is limited based on ASIC technology and requires more power, area, and cost. Further, these embodiments address the new NVMe feature of key selection by host.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   at least one memory configured to store a plurality of keys; and
   a controller comprising a cache configured to store a subset of the plurality of keys, wherein the controller is configured to:
   identify a command in a plurality of commands that requires a key that is stored in the cache in the controller, wherein the plurality of commands are arranged in an order; and
   execute the command even though the command is not a next command in the order, wherein the next command in the order requires a key that is stored in the memory but not in the cache.

2. The storage system of claim 1, wherein the controller is further configured to, in response to none of the plurality of commands requiring a key that is stored in the cache of the controller:
   evict a key that is stored in the cache of the controller;
   retrieve a key for one of the plurality of commands from the at least one memory; and
   store that key in the cache of the controller.

3. The storage system of claim 2, wherein the controller is further configured to choose the key to evict from the cache of the controller based on a prediction that the key will not be needed.

4. The storage system of claim 1, wherein the controller is further configured to:
   generate a new key; and
   store the new key in the cache in the controller.

5. The storage system of claim 1, wherein the controller is further configured to fetch, from a submission queue in a host, commands whose keys are likely stored in the cache in the controller.

6. The storage system of claim 5, wherein the controller is further configured to select which commands to fetch based on a history of key usage or machine learning.

7. The storage system of claim 1, wherein the controller comprises a command fetcher, a key manager, a command selector, and a security engine.

8. The storage system of claim 1, wherein the at least one memory comprises a three-dimensional memory.

9. The storage system of claim 1, wherein the plurality of commands comprise read and/or write commands.

10. In a storage system comprising at least one memory storing a plurality of keys and a controller comprising a cache storing a subset of the plurality of keys, a method comprising:
    receiving a plurality of commands from a host; and
    giving priority to a command whose key is stored in the cache in the controller over commands whose keys are stored only in the at least one memory and not in the cache.

11. The method of claim 10, further comprising:
    evicting a key that is stored in the cache of the controller;
    retrieving a key for one of the plurality of commands from the at least one memory; and
    storing that key in the cache of the controller.

12. The method of claim 11, further comprising choosing the key to evict from the cache of the controller based on a prediction that the key will not be needed.

13. The method of claim 10, further comprising fetching, from a submission queue in a host, commands whose keys are likely stored in the cache in the controller.

14. The method of claim 13, further comprising selecting which commands to fetch based on a history of key usage or machine learning.

15. The method of claim 10, wherein the plurality of commands comprise read and/or write commands.

16. A storage system comprising:
    at least one memory configured to store a plurality of keys;
    a controller comprising a cache configured to store a subset of the plurality of keys; and
    means for servicing a command whose key is stored in the at least one memory before servicing a command that requires a key to transferred from the at least one memory to the cache in the controller because that key is not in the cache.

17. The storage system of claim 1, wherein executing the command even though the command is not the next command in the order reduces key switching.

18. The storage system of claim 1, wherein executing the command even though the command is not the next command in the order avoids a possibility that the key required by the command will be evicted from the cache due to executing other commands located ahead of the command in the order.

19. The method of claim 10, wherein giving priority to the command reduces key switching.

20. The method of claim 10, wherein giving priority to the command avoids a possibility that the key required by the command will be evicted from the cache due to executing commands whose keys are stored only in the at least one memory and not in the cache.

* * * * *